US009554302B2

(12) United States Patent
Khay-Ibbat et al.

(10) Patent No.: US 9,554,302 B2
(45) Date of Patent: *Jan. 24, 2017

(54) QOS BASED BUFFERING WHILE TTI BUNDLING IS ENABLED

(71) Applicant: Apple Inc., Cupertino, CA (US)

(72) Inventors: Samy Khay-Ibbat, San Francisco, CA (US); Navid Damji, Cupertino, CA (US); Sreevalsan Vallath, Dublin, CA (US); Sarma V. Vangala, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,293

(22) Filed: Sep. 30, 2015

(65) Prior Publication Data

US 2016/0021563 A1 Jan. 21, 2016

Related U.S. Application Data

(63) Continuation of application No. 14/086,414, filed on Nov. 21, 2013, now Pat. No. 9,173,229.

(60) Provisional application No. 61/729,755, filed on Nov. 26, 2012.

(51) Int. Cl.
*H04W 28/02* (2009.01)
*H04W 72/12* (2009.01)

(52) U.S. Cl.
CPC ..... *H04W 28/0268* (2013.01); *H04W 72/1236* (2013.01)

(58) Field of Classification Search
CPC ............. H04W 72/00; H04W 28/0268; H04W 72/1236
See application file for complete search history.

(56) References Cited

U.S. PATENT DOCUMENTS

| | | | |
|---|---|---|---|
| 7,804,850 B2* | 9/2010 | Sebire | H04L 1/1812 370/230 |
| 8,121,117 B1* | 2/2012 | Amdahl | H04L 47/2441 370/229 |
| 8,441,932 B2* | 5/2013 | Zorba Barah | H04W 72/087 370/235 |
| 9,173,229 B2* | 10/2015 | Khay-Ibbat | H04W 28/0268 |
| 2005/0152397 A1* | 7/2005 | Bai | H04L 1/1887 370/468 |
| 2009/0109844 A1* | 4/2009 | Lee | H04L 12/5693 370/230 |
| 2009/0147684 A1* | 6/2009 | Majidi-Ahy | H04L 12/66 370/236 |

(Continued)

*Primary Examiner* — Andrew Lai
*Assistant Examiner* — Sumitra Ganguly
(74) *Attorney, Agent, or Firm* — Meyertons Hood Kivlin Kowert & Goetzel, P.C.; Jeffrey C. Hood; Joel L. Stevens

(57) ABSTRACT

QoS based uplink data buffering while TTI bundling is enabled by a wireless user equipment (UE) device. The UE may establish a packet-switched connection with a network via a wireless link. The UE may receive, at a media access control (MAC) layer, an indication to enable TTI bundling. The UE may selectively buffer uplink data at an application layer based on the indication to enable TTI bundling. The uplink data may be buffered selectively based on Quality of Service (QoS) considerations. Uplink transmissions may subsequently be performed using TTI bundling.

20 Claims, 4 Drawing Sheets

(56) References Cited

U.S. PATENT DOCUMENTS

| | | | |
|---|---|---|---|
| 2010/0042888 A1* | 2/2010 | Kuo | H04W 52/48 714/749 |
| 2013/0114446 A1 | 5/2013 | Liu et al. | |
| 2013/0242726 A1* | 9/2013 | Zhu | H04W 52/243 370/229 |

* cited by examiner

QOS BASED BUFFERING WHILE TTI BUNDLING IS ENABLED

PRIORITY CLAIM

The present application is a continuation of U.S. patent application Ser. No. 14/086,414, which issued as U.S. Pat. No. 9,173,229, entitled "QoS Based Buffering while TTI Bundling is Enabled", filed Nov. 21, 2013, which claims benefit of priority to U.S. Provisional Application No. 61/729,755 titled "QoS Based Buffering while TTI Bundling is Enabled" and filed on Nov. 26, 2012, both of which are hereby incorporated by reference in their entirety as though fully and completely set forth herein.

FIELD

The present subject matter relates to wireless devices, and more particularly to a system and method for a wireless device to implement Quality of Service (QoS) based buffering while transmission time interval (TTI) bundling is enabled.

DESCRIPTION OF THE RELATED ART

Wireless communication systems may be used for voice communications as well as data, such as Internet and multimedia content. While many existing wireless communication technologies utilize separate communication channels for voice and data communications, there is currently movement among many providers of wireless communication services towards wireless communication technologies which utilize packet-switched communication channels for all types of communications.

There are, however, numerous challenges to providing both voice services and data services via a shared packet-switched communications link. For example, it may be challenging to provide good connection quality for packet-switched voice communications, particularly in poor RF conditions, and even more so if the packet-switched communication link is also used to provide data services, since both of those factors may potentially reduce the throughput of the communication link available for voice communications. Accordingly, improvements in wireless communications would be desirable.

SUMMARY

Embodiments are presented herein of, inter alia, methods for QoS based data buffering while TTI bundling is enabled, and devices configured to implement the methods.

Because the media access control (MAC) layer of baseband operations at which TTI bundling may be implemented may not distinguish between voice and data packets, QoS based bundling while TTI bundling is enabled may include communication between the MAC layer and another layer in the device which does distinguish between voice and data packets, such as an application layer.

Thus, the techniques described herein may include features for communicating between baseband and application layer operations regarding when TTI bundling is and is not enabled, in order to support selective buffering of uplink data by the application layer when TTI bundling is enabled. The selective buffering of uplink data may be based on QoS requirements/priority levels, among various possibilities.

The techniques described herein may be implemented in and/or used with a number of different types of devices, including but not limited to, cellular phones, tablets, portable media players, wearable devices, and various other types of computers and computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings.

Figure 1:
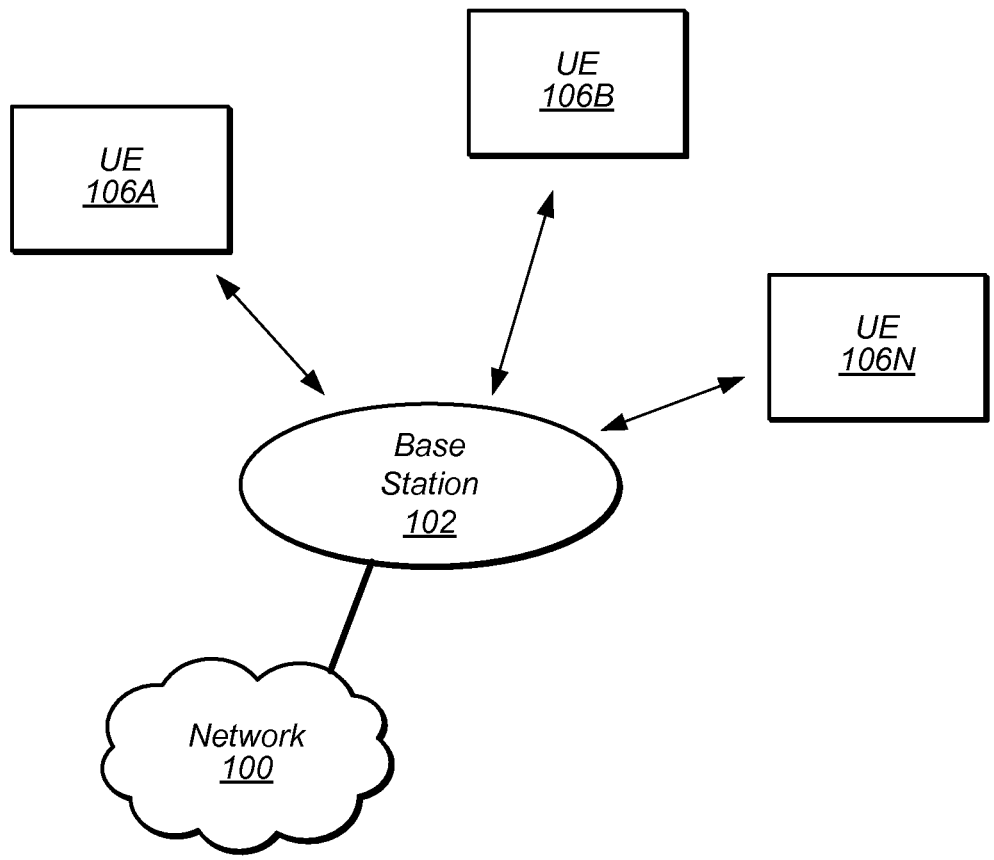
FIG. 1 illustrates an exemplary (and simplified) wireless communication system.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure:
UE: User Equipment
BS: Base Station
GSM: Global System for Mobile Communication
UMTS: Universal Mobile Telecommunication System
LTE: Long Term Evolution
MAC: Media Access Control
HARQ: Hybrid Automatic Repeat Request
TTI: Transmission Time Interval
QoS: Quality of Service

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
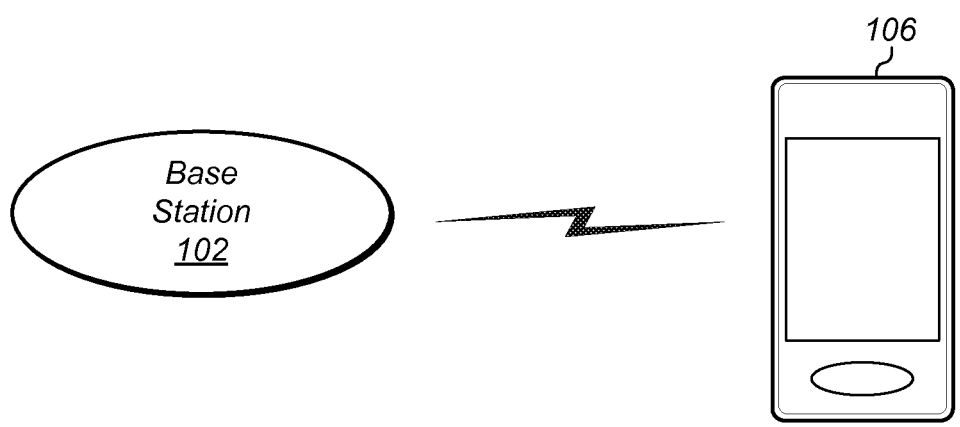
FIG. 2 illustrates a base station in communication with a wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with UEs 106A, 106B, etc., through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell."

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

UE 106 may be configured to communicate using a wireless communication protocol which provides both voice and data services via packet-switched communications. For example, the UE 106 may be configured to communicate using LTE or LTE-A with Voice over LTE (VoLTE) support. Alternatively, the UE 106 may be configured to communicate using one or more other wireless communication protocols which provide both voice and data services via packet-switched communications.

Furthermore, UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols. For example, the UE 106 may include one or more antennas to communicate using a wireless communication protocol which provides both voice and data services via packet-switched communications. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1xRTT, and separate radios for communicating using each of Wi-Fi and Bluetooth. Other configurations are also possible.

Figure 3:
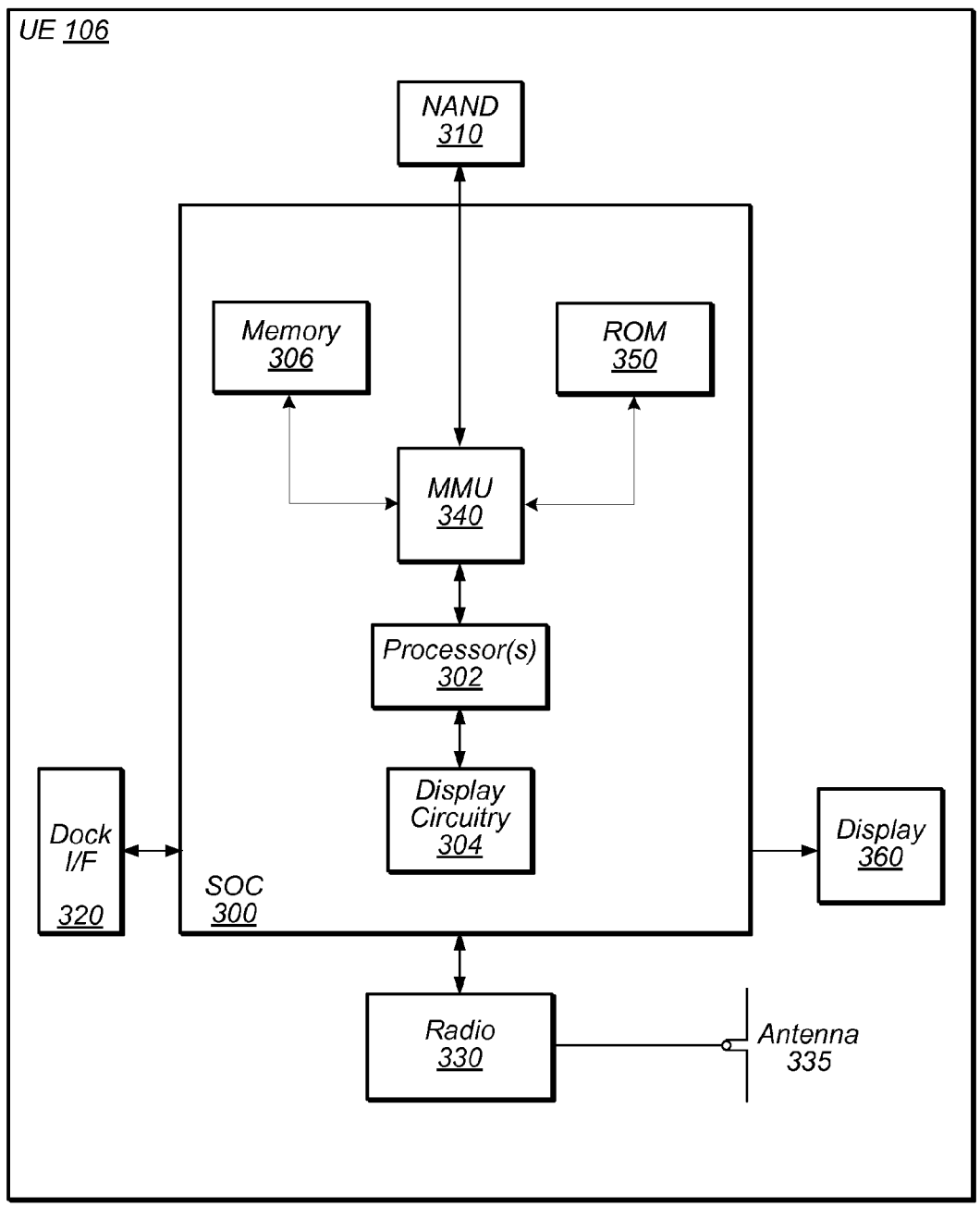
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, etc.), the display 340, and wireless communication circuitry/radio 330 (e.g., for LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using packet-switched communications for both voice and data services.

As described further subsequently herein, the UE 106 may include hardware and software components for implementing a method for implementing QoS based buffering while TTI bundling is enabled. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
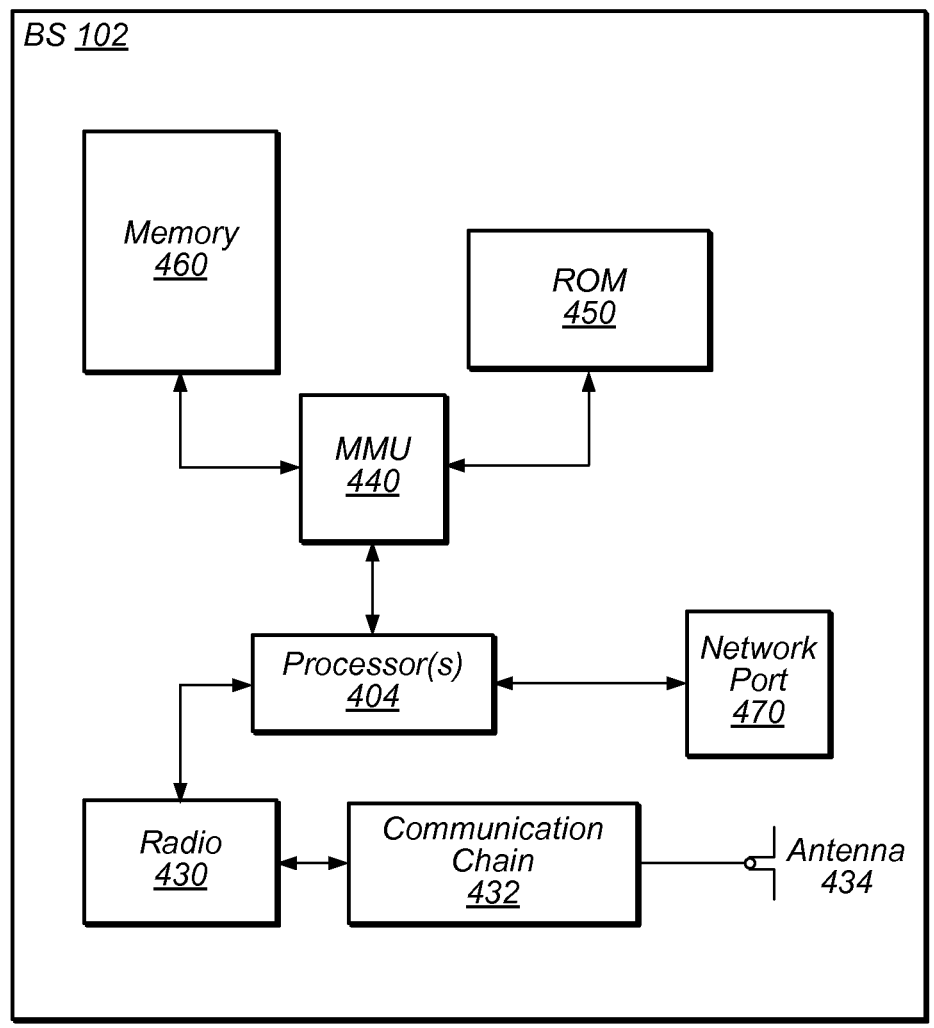
FIG. 4 illustrates an exemplary block diagram of a base station.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

TTI bundling may be a modification of a Hybrid Automatic Repeat Request (HARQ) feature which may be implemented at the media access control (MAC) layer of a device according to some wireless communication technologies. Typically the use of HARQ may include waiting for an ACK/NACK after a first transmission attempt, and if it is determined that the first transmission attempt was unsuccessful, performing a HARQ retransmission. This may be repeated up to a certain (e.g., network configured maximum) number of retransmissions. In the case of TTI bundling, instead of waiting for an ACK/NACK before performing a HARQ retransmission, multiple HARQ transmissions of a single packet may be performed in successive TTIs. This feature may provide very robust packetized uplink transmissions with low latency, which may be useful for voice communications in difficult RF conditions, which may not require a high throughput but may have strict latency requirements.

Figure 5:
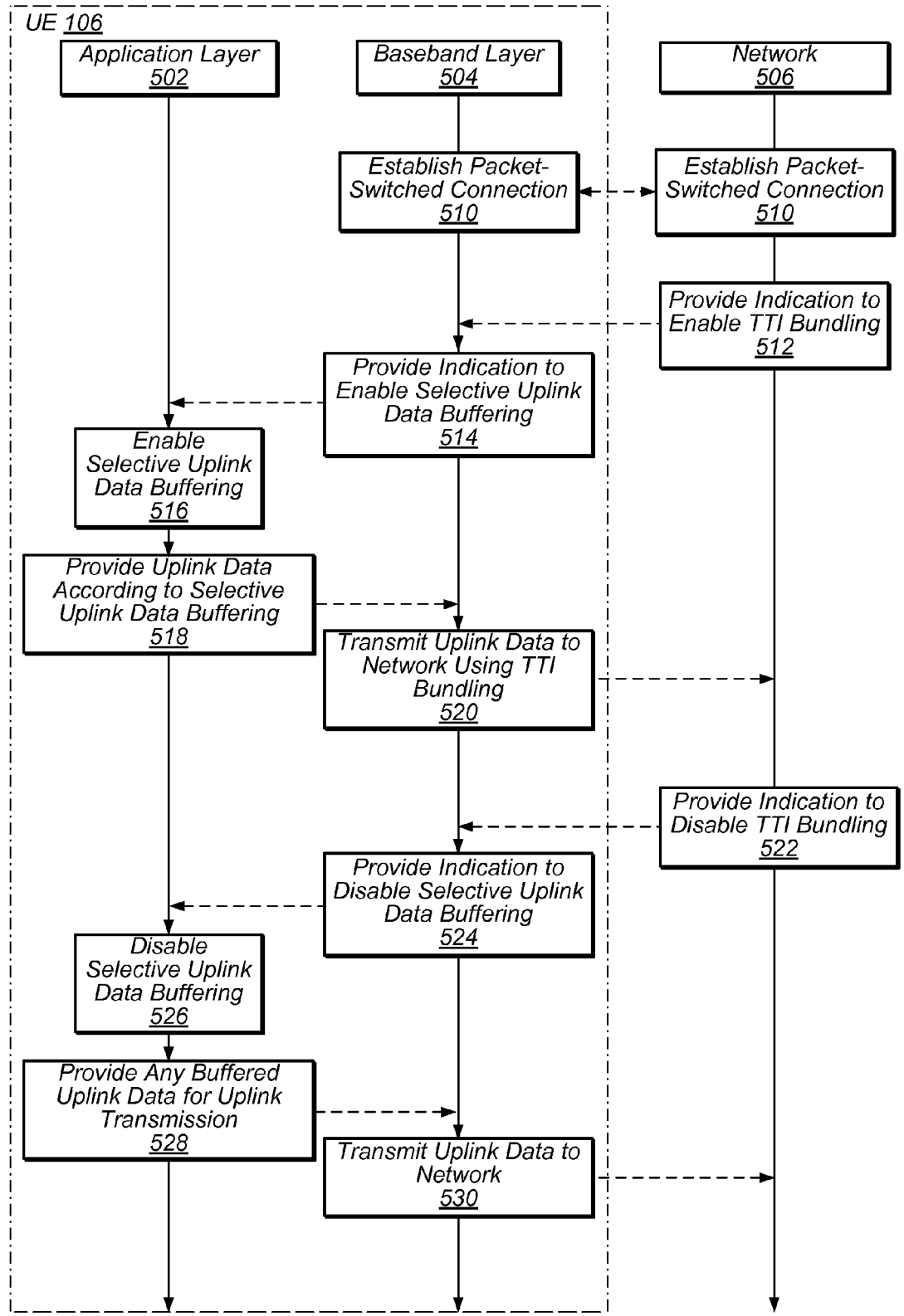
FIG. 5 is a flowchart diagram illustrating a method for a UE to selectively buffer uplink data based on QoS considerations while TTI bundling is enabled according to one embodiment.

Since TTI bundling (and many techniques for increasing robustness of communications in general) may negatively impact power consumption and throughput, however, it may be beneficial to avoid using TTI bundling for at least some (e.g., low priority) uplink data transmissions. Since TTI bundling may be implemented at the MAC layer, which (at least according to some wireless communication technologies) may not distinguish between voice and data packets, one possibility for avoiding using TTI bundling for lower priority uplink communications may include providing an indication from the layer at which the feature is implemented, upon enablement of the feature, to another layer in the device which does distinguish between voice and data packets. Based on this indication, the layer (e.g., an application layer) which is able to distinguish between various types of packets may be able to implement selective buffering of lower priority data types as long as the feature is enabled. FIG. 5 is a flowchart diagram illustrating a method implementing such features, for example, for a UE device 106 to implement Quality of Service (QoS) based buffering while transmission time interval (TTI) bundling is enabled.

The method shown in FIG. 5 may be used in conjunction with any of the computer systems or devices shown in the above Figures, among other devices. For example, part or all of the method may be implemented by device logic of the UE 106, possibly in conjunction with a radio of the UE 106. In particular, as shown, part of the method may be implemented at an application layer 502 of the UE 106 while part of the method may be implemented at a baseband layer 504 of the UE. For example, the baseband layer 504 (which may be configured to control operation of some or all radio components, and may be implemented as a software layer, as hardware logic, or a combination thereof, among various possibilities) may interact with the application layer 502 (which may be configured to provide application level functionality to users, and may also be implemented as a software layer, as hardware logic, or a combination thereof, among various possibilities) to implement the method. In some instances, the baseband layer may be implemented by a baseband processor, while the application layer may be implemented by a separate (but communicatively coupled) application processor. Additionally, as shown, the baseband layer 504 may communicate with a network 506 as part of the method. In various embodiments, some of the method elements shown may be performed concurrently, in a different order than shown, or may be omitted. Additional method elements may also be performed as desired. As shown, this method may operate as follows.

In 510, a connection between the UE 106 and the network 506 may be established via a wireless link, e.g., with a cell. The wireless link may operate according to any of various wireless technologies. The wireless link may be a cellular link according to a cellular technology such as GSM, UMTS, LTE, CDMA2000 (1×RTT, 1×EV-DO), etc. The cell may accordingly be provided by a base station 102 and may provide a connection to the network 506, which may be a core network, e.g., of a cellular service provider, or any other network, as desired. It may be common for the base station 102 to operate in conjunction with numerous other base stations (which may provide other cells) and other network hardware and software to provide continuous (or nearly continuous) overlapping wireless service over a wide geographic area.

The cell may serve the UE 106 and provide the connection to the network 506 via the wireless link, and as such may act as the "serving" cell for the UE 106. There may also be one or more "neighboring" cells, provided by nearby base stations, with which the UE 106 may be capable of discovering, detecting signals from, and possibly communicating, but with which the UE 106 may not have an active wireless link.

Configuration information may be received from the cell and/or from the network 506 as part of establishing the connection with the network. For example, as part of the process of attaching to the network 506 (e.g., via the cell, or previously via another cell), the UE 106 may receive configuration information indicating various policies and procedures implemented by the network operator (e.g., the cellular service provider), according to which the UE 106 may be expected to operate.

The connection may include a packet-switched connection. In particular, it may be the case that the packet-switched connection with the network 506 provides the UE 106 with both voice and data services. For example, the UE 106 and the network 506 may operate according to LTE or LTE-A, and may both support Voice over LTE (VoLTE).

At some point after the packet-switched connection has been established between the UE 106 and the network 506, in 512, the network 506 may provide (e.g., transmit) an indication to enable transmission time interval (TTI) bundling to the baseband layer 504. TTI bundling may be implemented at a media access control (MAC) layer of the baseband 504 for uplink transmissions in response to the indication. TTI bundling may include transmitting each Hybrid Automatic Repeat Request (HARQ) protocol data unit (PDU, generally considered a type of packet) multiple (e.g., 2, 3, 4, etc.) times consecutively (e.g., in consecutive TTIs).

Transmitting each uplink HARQ PDU multiple times in succession in this manner may allow for more robust reception by the network 506 without having to use the traditional HARQ retransmission mechanism (e.g., waiting up to a certain amount of time after a transmission or HARQ retransmission for an acknowledgement (ACK) or negative acknowledgement (NACK) before attempting a(nother) HARQ retransmission if appropriate). This may be advantageous in particular in poor RF conditions for voice calls and other types of communication which require low latency but do not necessarily require high throughput: in such cases, the additional robustness provided by TTI bundling may make a significant difference in connection quality.

Accordingly, the network 506 may indicate to the UE 106 to enable TTI bundling based on poor RF conditions, e.g., during a voice call. For example, if the network 506 (e.g., via a base station 102) has required multiple HARQ retransmissions or failed altogether to receive recent uplink transmissions from the UE 106, and/or if channel quality indicators (CQI) are indicative of poor channel conditions (e.g., such as might occur at a cell edge or inside a building), the network 506 may determine to indicate to the UE 106 to enable TTI bundling. Any of a variety of other reasons for enabling TTI bundling may also or alternatively be possible.

However, a potential challenge with TTI bundling is that in a context in which both voice and data (non-voice) packets are to be transmitted (such as LTE and LTE-A implementations in which VoLTE is supported), the feature may be applied to both types of packets, since there may be no distinction between them at the MAC layer. If TTI bundling is applied to data packets, there may be several possible negative impacts on the UE 106 and the network 506.

For example, devoting multiple TTIs to transmission of lower priority data packets (or even segmented voice and data packets) in challenging RF conditions may negatively affect voice transmission reliability by the UE 106, e.g., if insufficient device resources remain for transmission of higher priority voice packets. In addition, devoting multiple TTIs to transmission of lower priority data packets may unnecessarily drain the battery of the UE 106, e.g., if those data packets could have been successfully transmitted in a single TTI (or at least fewer TTIs, e.g., via normal HARQ retransmissions, than used in TTI bundling).

On the network 506 side, while efficient power use may still be desirable, it may not be as significant of a concern as for the UE 106. However, inefficient use of network 506 resources may be a significant concern. In general, the network 506 may lose scheduling flexibility (since multiple successive TTIs may be required for a single packet) when TTI bundling is enabled; this may be a poor trade-off if TTI bundling is used for data packets for which the benefits of TTI bundling are minimal. Further, if a data packet could be successfully transmitted in a single TTI (or at least fewer TTIs, e.g., via normal HARQ retransmissions, than used in TTI bundling), the network 506 may essentially lose some scheduling opportunities when the UE 106 utilizes TTI bundling for transmission of a data packet.

Accordingly, it would be desirable to mitigate the negative effects of performing TTI bundling for data packets, particularly low-priority data packets. In particular, an approach which includes application layer data buffering based on Quality of Service (QoS) considerations when TTI bundling is enabled may substantially avoid or reduce transmission of lower-priority packets while TTI bundling is enabled, thereby providing better QoS for voice communications and other applications which require high QoS. In other words, it may be desirable for the application layer 502 to selectively buffer uplink data while TTI bundling is enabled. Thus, in 514, the baseband layer 504 may provide an indication to enable selective uplink data buffering to the application layer 502.

In 516, the application layer 502 may enable selective uplink data buffering. As noted above, the selective uplink data buffering may be based on QoS considerations. Thus, lower priority uplink data may be buffered for a longer period of time, while higher priority data may be buffered for a shorter period of time, or not at all, before the application layer 502 provides the uplink data to the baseband layer 504 for uplink transmission.

For example, as one possible set of designations, the application layer 502 may distinguish between background data (e.g., data which is not user initiated), user initiated data with low QoS requirements, and user initiated data with high QoS requirements. Voice data may be considered user initiated data with high QoS requirements, or may be considered another type of data (e.g., with a highest priority level) altogether. Those skilled in the art will readily recognize that while the above-provided distinctions between types of data represent one possible set of QoS designations, numerous other designations and distinctions are possible.

In 518, the application layer 502 may provide uplink data to the baseband layer 504 according to the selective uplink data buffering policy implemented at the application layer 502. For example, using the above-provided exemplary set of designations, the application layer 502 might implement the following selective uplink data buffering policy. Those skilled in the art will also readily recognize that while the following selective uplink data buffering policy represents one possible selective uplink data buffering policy, numerous other policies (e.g., which may utilize different priority/QoS level distinctions and/or may selectively buffer data in a different manner based on the priority/QoS level distinctions) are possible.

Background data may be buffered for up to a first predetermined period of time (e.g., until a first timer or "T1" expires), or until TTI bundling is disabled and/or an indication is received by the application layer 502 to cease selective uplink data buffering. Once either of those events occurs, the background data may be provided to the baseband layer 504 for uplink transmission. Similarly, low QoS user initiated data may be buffered for up to a second predetermined period of time (e.g., until a second timer or "T2" expires), or until TTI bundling is disabled and/or an indication is received by the application layer 502 to cease selective uplink data buffering. The second predetermined period of time may be less than the first predetermined period of time (e.g., T2 may be shorter than T1). As with background data, once either of those events occurs, the low QoS user initiated data may be provided to the baseband layer 504 for uplink transmission.

For high QoS user initiated data, the application layer 502 may substantially immediately provide the data to the baseband layer 504 for uplink transmission, e.g., without buffering the high QoS user initiated data for any length of time. However, if this high QoS user initiated data is unsuccessfully transmitted by the baseband layer 504, and the UE 106 determines that the UE 106 is substantially stationary, subsequent attempts to transmit data might be expected to be similarly unsuccessful, and thus might be expected to drain the battery of the UE 106 without providing any benefit. In such a case, instead of providing subsequent high QoS user initiated data to the baseband layer 504 substantially immediately for uplink transmission, the application layer 502 may buffer the subsequent high QoS user initiated data for up to a third predetermined period of time (e.g., until a third timer or "T3" expires, where T3 has a shorter length than T2 or T1), or until TTI bundling is disabled and/or an indication is received by the application layer 502 to cease selective uplink data buffering, or possibly until the UE 106 is no longer substantially stationary (e.g., since mobile conditions may allow for time and frequency diversity as well as possible improvements to RF conditions) and/or RF conditions improve. Once any of those events occurs, the high QoS user initiated data may be provided to the baseband layer 504 for uplink transmission. If TTI bundling is disabled and/or an indication is received by the application layer 502 to cease selective uplink data buffering, or if the UE 106 is no longer substantially stationary and/or RF conditions improve, further subsequent high QoS user initiated data may again be provided to the baseband layer 504 substantially immediately.

Note that determination of substantially stationary conditions may be performed in any of a variety of ways, based on any of a variety of factors. For example, it is possible that the UE 106 may track RF channel conditions and determine based on a certain (e.g., predetermined) consistency (or lack of consistency) of signal strength measurements (e.g., higher or lower than a certain threshold for at least a certain number of measurements) whether or not the UE 106 is in substantially stationary conditions. As another possibility, the UE 106 may utilize another wireless communication technology to determine whether substantially stationary conditions exist; for example, if the UE 106 is associated with/connected to an access point providing a wireless local area network (WLAN, e.g., according to IEEE 802.11/Wi-Fi), this may be an indication that the UE 106 is in substantially stationary conditions. Any number of other techniques and/or factors may alternatively or additionally be used to determine whether the UE 106 is substantially stationary, as will be recognized by those skilled in the art.

Note also that, if desired, selective buffering may be applied only to non-voice data. For example, while non-voice data packets of varying priority levels/having varying QoS requirements may be subject to a selective buffering policy such as the exemplary selective buffering policy described hereinabove, voice data may always be provided substantially immediately (e.g., without buffering for any length of time) to the baseband layer 504 for uplink transmission. Alternatively, if desired, selective buffering may also be applied to voice data; for example, voice data might be designated as user initiated high QoS data. Note also that, if desired, even if voice data is exempted from the selective buffering policy, in some situations voice data may not always be provided substantially immediately to the baseband layer 504 for uplink transmission (e.g., may be temporarily buffered for some other reason).

Further, note that in general, the timers T1, T2, and T3 may be have any of a variety of lengths, which may be optimally determined based on or in conjunction with various other system parameters, possibly including but not limited to a TTI length, a HARQ retransmission timer length, a number of TTIs in a TTI bundle, a modulation and coding scheme (MCS) assignment, and/or any number of other parameters.

In 520, the baseband layer 504 may transmit uplink data to the network 506 using TTI bundling. The uplink data may include voice and/or non-voice data, e.g., based on whatever data has been provided by the application layer 502 for uplink transmission. Since lower priority data may generally be buffered for a period of time before being provided to the baseband layer 504, however, it may be more common that uplink transmissions while TTI bundling is enabled include voice-only or primarily voice packets. This may advantageously reduce the use of TTI bundling for low priority non-voice data, for which the feature may not be ideally suited, and thus primarily provide the feature's substantial increase in uplink transmission robustness for voice (and potentially other high-priority data) packets for which the feature may be better suited.

At some point, it may be desirable to cease performing TTI bundling. For example, if RF conditions have improved such that transmissions from the UE 106 to the network 506 are received with greater reliability, it may be desirable for the UE 106 to cease performing TTI bundling, e.g., in order to potentially save battery and increase link throughput. As another possibility, voice communications may have ceased (e.g., a voice call may have ended). Other situations in which it may be desirable to cease performing TTI bundling are also possible. Accordingly, in 522 (e.g., at some subsequent point in time), the network may provide (e.g., transmit) an indication to disable TTI bundling to the baseband layer 504.

The baseband layer 504 may accordingly disable the TTI bundling feature. Further, in response to the indication to disable TTI bundling, in 524, the baseband layer 504 may provide an indication to disable selective uplink data buffering to the application layer 502. For example, since TTI bundling may no longer be enabled, there may not be sufficient reason to continue selective uplink data buffering at the application layer 502.

In 526, the application layer 502 may disable selective uplink data buffering, e.g., in response to the indication from the baseband layer 504 to do so. In other words, the application layer 502 may provide any subsequently received uplink data (e.g., including background data, low QoS user initiated data, and high QoS user initiated data) to the baseband layer 504 for uplink transmission substantially immediately. In addition, in 528, the application layer 502 may provide any buffered uplink data (such as background data waiting for T1 to expire, low QoS user initiated data waiting for T2 to expire, and/or high QoS user initiated data waiting for T3 to expire, according to the exemplary selective buffering policy described hereinabove) to the baseband layer 504 for uplink transmission.

In 530, the baseband layer 504 may transmit the uplink data (e.g., including any uplink data released from the application layer 502 buffers and/or any subsequently generated/received uplink data) to the network 506. Since TTI bundling may have been disabled, the uplink data may be transmitted not using TTI bundling in step 530. The baseband layer 504 (e.g., including the MAC layer) may however use HARQ retransmissions, if necessary, e.g., based on ACK/NACK indications received from the network 506.

Thus, by utilizing the method of FIG. 5 as provided above according to various embodiments, a UE 106 may implement TTI bundling for packet-switched voice calls, particularly in poor RF conditions, while avoiding performing TTI bundling for low priority data to a significant degree. In particular, selectively buffering lower priority data while TTI bundling is enabled may reduce the amount of lower priority data which is transmitted using TTI bundling, thereby freeing uplink resources (which may be scarce in poor RF conditions typically associated with TTI bundling) for voice (and possibly other high priority) data. Furthermore, by selectively buffering lower priority data while TTI bundling is enabled, the UE 106 may potentially conserve battery and avoid tying up network resources which might potentially be better used elsewhere in the network 506.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, the UE device comprising:
an antenna;
a radio, operably coupled to the antenna;
a processing element, operably coupled to the radio;
wherein the UE device is configured to:
establish a packet-switched connection with a network via a wireless link;
receive, at a media access control (MAC) layer of the UE device, an indication from the network to bundle uplink transmissions, wherein bundling the uplink transmissions comprises transmitting each uplink packet at multiple consecutive transmission intervals;
provide, from the MAC layer to an application layer of the UE device, an indication to selectively buffer uplink data based on the indication to bundle the uplink transmissions; and
selectively buffer the uplink data at the application layer.

2. The UE device of claim 1, wherein the UE device is further configured to:
exchange voice data and non-voice data via the packet-switched connection with the network,
wherein selectively buffering the uplink data comprises selectively buffering the non-voice data, wherein the voice data is provided to the MAC layer for uplink transmission without buffering.

3. The UE device of claim 1, wherein the uplink data is selectively buffered at the application layer based at least in part on Quality of Service (QoS) requirements of the uplink data, wherein to selectively buffer the uplink data at the application layer, the UE device is further configured to:
buffer background data for up to a first predetermined amount of time, then provide the background data to the MAC layer for uplink transmission;
buffer low QoS data for up to a second predetermined amount of time, then provide the low QoS data to the MAC layer for uplink transmission, wherein the second predetermined amount of time is less than the first predetermined amount of time; and
provide high QoS data to the MAC layer for uplink transmission without buffering the high QoS data.

4. The UE device of claim 3, wherein the UE device is further configured to:
detect that the high QoS data was not successfully transmitted at the MAC layer;
determine that the UE device is in a stationary state; and
buffer subsequent high QoS data for up to a third predetermined amount of time, then provide the subsequent high QoS data to the MAC layer for uplink transmission, wherein the third predetermined amount of time is less than the second predetermined amount of time.

5. The UE device of claim 1, wherein the UE device is further configured to:
receive, at the MAC layer, an indication from the network to cease bundling the uplink transmissions; and
provide, from the MAC layer to the application layer, an indication to cease selectively buffering the uplink data based on the indication to cease bundling the uplink transmissions.

6. The UE device of claim 5, wherein the UE device is further configured to:
provide any uplink data buffered at the application layer to the MAC layer for uplink transmission based on the indication to cease selectively buffering the uplink data.

7. The UE device of claim 1,
wherein the packet-switched connection comprises an LTE connection, wherein the LTE connection provides Voice over LTE (VoLTE) service and data service.

8. The UE device of claim 1,
wherein the indication to bundle the uplink transmissions comprises an indication to enable transmission time interval (TTI) bundling.

9. An apparatus, comprising:
a processing element;
wherein the processing element is configured to:

establish a packet-switched connection with a network via a wireless link;
receive an indication from the network to enable transmission time interval (TTI) bundling, wherein TTI bundling comprises transmitting each uplink packet at multiple consecutive transmission intervals;
provide an indication, from a baseband layer to an application layer, to selectively buffer uplink data based on the indication to enable the TTI bundling;
receive, at the baseband layer from the application layer, packets for uplink transmission; and
transmit the packets using the TTI bundling.

10. The apparatus of claim 9, wherein the processing element is further configured to:
receive an indication from the network to disable the TTI bundling; and
provide, from the baseband layer to the application layer, an indication to cease selectively buffering the uplink data based on the indication to disable the TTI bundling.

11. The apparatus of claim 9,
wherein the packet-switched connection comprises an LTE connection providing voice and data services, wherein the TTI bundling is implemented at a media access control (MAC) layer, wherein the MAC layer does not distinguish between voice packets and data packets.

12. The apparatus of claim 9, wherein the processing element is further configured to:
determine that the apparatus is stationary and that one or more uplink packets were unsuccessfully transmitted; and
provide an indication, from the baseband layer to the application layer, that the apparatus is stationary and that the one or more uplink packets were unsuccessfully transmitted.

13. The apparatus of claim 9, wherein the processing element is further configured to:
receive, at the application layer from the baseband layer, the indication to selectively buffer the uplink data; and
selectively buffer the uplink data based on Quality of Service (QoS) requirements of the uplink data in response to the indication to selectively buffer the uplink data,
wherein uplink data with no QoS requirements is buffered until a first timer expires or until an indication is received to cease selectively buffering uplink data, then the uplink data with no QoS requirements is provided to the baseband layer,
wherein uplink data with low QoS requirements is buffered until a second timer expires or until an indication is received to cease selectively buffering uplink data, then the uplink data with low QoS requirements is provided to the baseband layer, wherein the second timer has a shorter length than the first timer,
wherein uplink data with high QoS requirements is provided to the baseband layer without buffering the uplink data with high QoS requirements.

14. The apparatus of claim 13, wherein the processing element is further configured to:
receive an indication, at the application layer from the baseband layer, that the baseband layer was unable to transmit the uplink data with high QoS requirements and that the apparatus is stationary; and
buffer subsequent uplink data with high QoS requirements until a third timer expires or until an indication is received to cease selectively buffering the uplink data, then provide the uplink data with high QoS requirements to the baseband layer, wherein the third timer has a shorter length than the second timer.

15. The apparatus of claim 13, wherein the processing element is further configured to:
receive an indication to cease selectively buffering the uplink data; and
provide, from the application layer to the baseband layer, any buffered uplink data in response to the indication to cease selectively buffering the uplink data.

16. A non-transitory computer accessible memory medium comprising program instructions which, when executed at a wireless user equipment (UE) device, cause the UE device to:
establish a packet-switched connection with a network via a wireless link, wherein the packet-switched connection is used for transmission of both voice data and non-voice data;
receive, at a media access control (MAC) layer of the UE device, an indication from the network to enable transmission time interval (TTI) bundling for uplink transmissions;
provide, from the MAC layer to an application layer of the UE device, an indication to selectively buffer the non-voice uplink data based on the indication to enable the TTI bundling for the uplink transmissions;
selectively buffer the non-voice uplink data at the application layer in response to the indication to selectively buffer the non-voice uplink data; and
provide voice uplink data from the application layer to the MAC layer for uplink transmission without buffering.

17. The memory medium of claim 16, wherein the program instructions to selectively buffer non-voice uplink data at the application layer further cause the UE device to:
buffer the non-voice uplink data for up to a variable length of time before providing the non-voice uplink data from the application layer to the MAC layer for uplink transmission, wherein the variable length of time is determined based on Quality of Service (QoS) requirements of the non-voice uplink data.

18. The memory medium of claim 17, wherein the non-voice uplink data comprises one of:
user initiated data; or
background data,
wherein user initiated data has higher QoS requirements than background data.

19. The memory medium of claim 16, wherein the program instructions further cause the UE device to:
receive, at the MAC layer, an indication from the network to disable the TTI bundling for the uplink transmissions;
provide, from the MAC layer to the application layer, an indication to cease selectively buffering the non-voice uplink data based on the indication to disable the TTI bundling for the uplink transmissions; and
provide any buffered non-voice uplink data from the application layer to the MAC layer for uplink transmission based on the indication to cease selectively buffering the non-voice uplink data.

20. The memory medium of claim 16,
wherein the TTI bundling is implemented at the MAC layer of the UE device, wherein the TTI bundling comprises transmitting each hybrid automatic repeat request (HARD) protocol data unit (PDU) in four consecutive TTIs.

* * * * *